(12) United States Patent
Chang

(10) Patent No.: US 7,637,640 B2
(45) Date of Patent: Dec. 29, 2009

(54) TWO-LAYERED OPTICAL PLATE

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 78 days.

(21) Appl. No.: 11/933,440

(22) Filed: Nov. 1, 2007

(65) Prior Publication Data
US 2009/0027897 A1    Jan. 29, 2009

(30) Foreign Application Priority Data
Jul. 26, 2007    (CN) .................. 2007 1 0201176

(51) Int. Cl.
*F21V 5/00* (2006.01)
(52) U.S. Cl. ............ 362/330; 362/339; 362/618; 362/620; 349/64; 359/599; 359/837
(58) Field of Classification Search .......... 362/330, 362/339, 617–620; 349/62, 64; 359/599, 359/831, 837
See application file for complete search history.

(56) References Cited

U.S. PATENT DOCUMENTS 6,752,505 B2 * 6/2004 Parker et al. ............. 362/330
2008/0117515 A1 * 5/2008 Hsu et al. ................. 359/599

* cited by examiner

*Primary Examiner*—Stephen F Husar
(74) *Attorney, Agent, or Firm*—Frank R. Niranjan

(57) ABSTRACT

An exemplary optical plate includes a transparent layer and a light diffusion layer. The transparent layer includes a light input interface and a light output surface opposite to the light input interface. A plurality of micro-protrusions formed on the light output surface. The micro-protrusions are arranged along a plurality of separate, circular arcs. Each micro-protrusion has four side surfaces connected to each other, and a transverse width of each side surface decreases along a direction away from the light diffusion layer. The light diffusion layer is integrally formed in immediate contact with the light input interface of the transparent layer, and free of air or gas pockets trapped in an interface therebetween. The light diffusion layer includes a transparent matrix resin and a plurality of diffusion particles dispersed in the transparent matrix resin.

10 Claims, 5 Drawing Sheets

TWO-LAYERED OPTICAL PLATE

CROSS-REFERENCE TO RELATED APPLICATIONS

This application is related to three co-pending U.S. Patent Applications, which are: application Ser. No. 11/875,958, Ser. No. 11/875,959, filed on Oct. 22, 2007, and entitled "TWO-LAYERED OPTICAL PLATE", application Ser. No. 11/933,437, and entitled "OPTICAL PLATE AND LIQUID CRYSTAL DISPLAY DEVICE USING THE SAME". In all the co-pending applications, the inventor is Shao-Han Chang. All of the co-pending applications have the same assignee as the present application.

BACKGROUND OF THE INVENTION

1. Field of the Invention

The present invention generally relates to optical plates, and more particularly to an optical plate for use in, for example, a liquid crystal display (LCD).

2. Discussion of the Related Art

The lightness and slimness of LCD panels make them suitable for a wide variety of uses in electronic devices such as personal digital assistants (PDAs), mobile phones, portable personal computers, and other electronic appliances. Liquid crystal is a substance that does not illuminate light by itself. Instead, the liquid crystal relies on light received from a light source in order for the liquid crystal to display information. In a typical liquid crystal display device, a backlight module powered by electricity supplies the needed light.

FIG. 5 is an exploded, side cross-sectional view of a typical backlight module 10 employing a typical optical diffusion plate. The backlight module 10 includes a housing 11, a plurality of lamps 12 disposed in the housing 11, a light diffusion plate 13 and a prism sheet 14. The light diffusion plate 13 and the prism sheet 14 are stacked on the housing 11 in that order. The lamps 12 emit light, and inside walls of the housing 11 are configured for reflecting some of the light upwards. The light diffusion plate 13 includes a plurality of embedded dispersion particles. The dispersion particles are configured for scattering received light, and thereby enhancing the uniformity of light that exits the light diffusion plate 13. The prism sheet 14 includes a plurality of V-shaped structures on a top thereof. The V-shaped structures are configured for collimating received light to a certain extent.

In use, light emitted from the lamps 12 enters the prism sheet 14 after being scattered in the diffusion plate 13. The light is refracted by the V-shaped structures of the prism sheet 14 and is thereby concentrated, so that a brightness of light illumination is increased. Finally, the light propagates into an LCD panel (not shown) disposed above the prism sheet 14. The brightness of light illumination may be improved by the V-shaped structures of the prism sheet 14, but the viewing angle may be narrow. In addition, although the diffusion plate 13 and the prism sheet 14 are in contact with each other, a plurality of air pockets still exists at the boundary therebetween. When the backlight module 10 is in use, light passes through the air pockets, and some of the light undergoes total reflection at one or another of the corresponding boundary. As a result, the light energy utilization ratio of the backlight module 10 is reduced.

Therefore, a new optical means is desired in order to overcome the above-described shortcomings.

SUMMARY

An optical plate according to a preferred embodiment includes a transparent layer and a light diffusion layer. The transparent layer includes a light input interface and a light output surface opposite to the light input interface. A plurality of micro-protrusions formed on the light output surface. The micro-protrusions are arranged along a plurality of separate, circular arcs. Each micro-protrusion has four side surfaces connected to each other, and a transverse width of each side surface decreases along a direction away from the light diffusion layer. The light diffusion layer is integrally formed in immediate contact with the light input interface of the transparent layer, and free of air or gas pockets trapped in an interface therebetween. The light diffusion layer includes a transparent matrix resin and a plurality of diffusion particles dispersed in the transparent matrix resin.

Other advantages and novel features will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating principles of the present optical plate. Moreover, in the drawings, like reference numerals designate corresponding parts throughout several views, and all the views are schematic.

DETAILED DESCRIPTION OF THE EMBODIMENTS

Reference will now be made to the drawings to describe preferred embodiments of the present optical plate, in detail.

Figure 1:
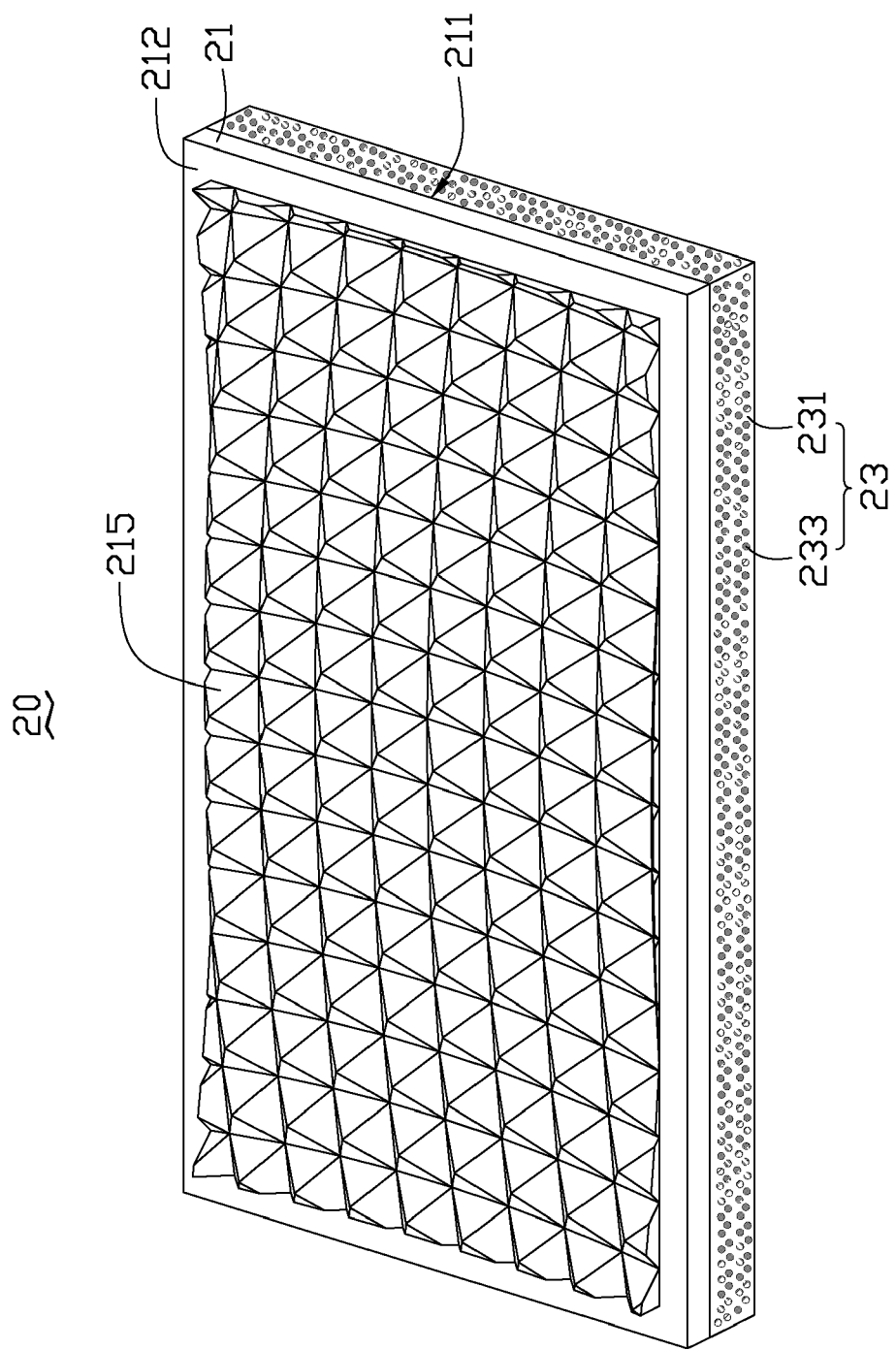
FIG. 1 is an isometric view of an optical plate in accordance with a first embodiment of the present invention.
Figure 2:
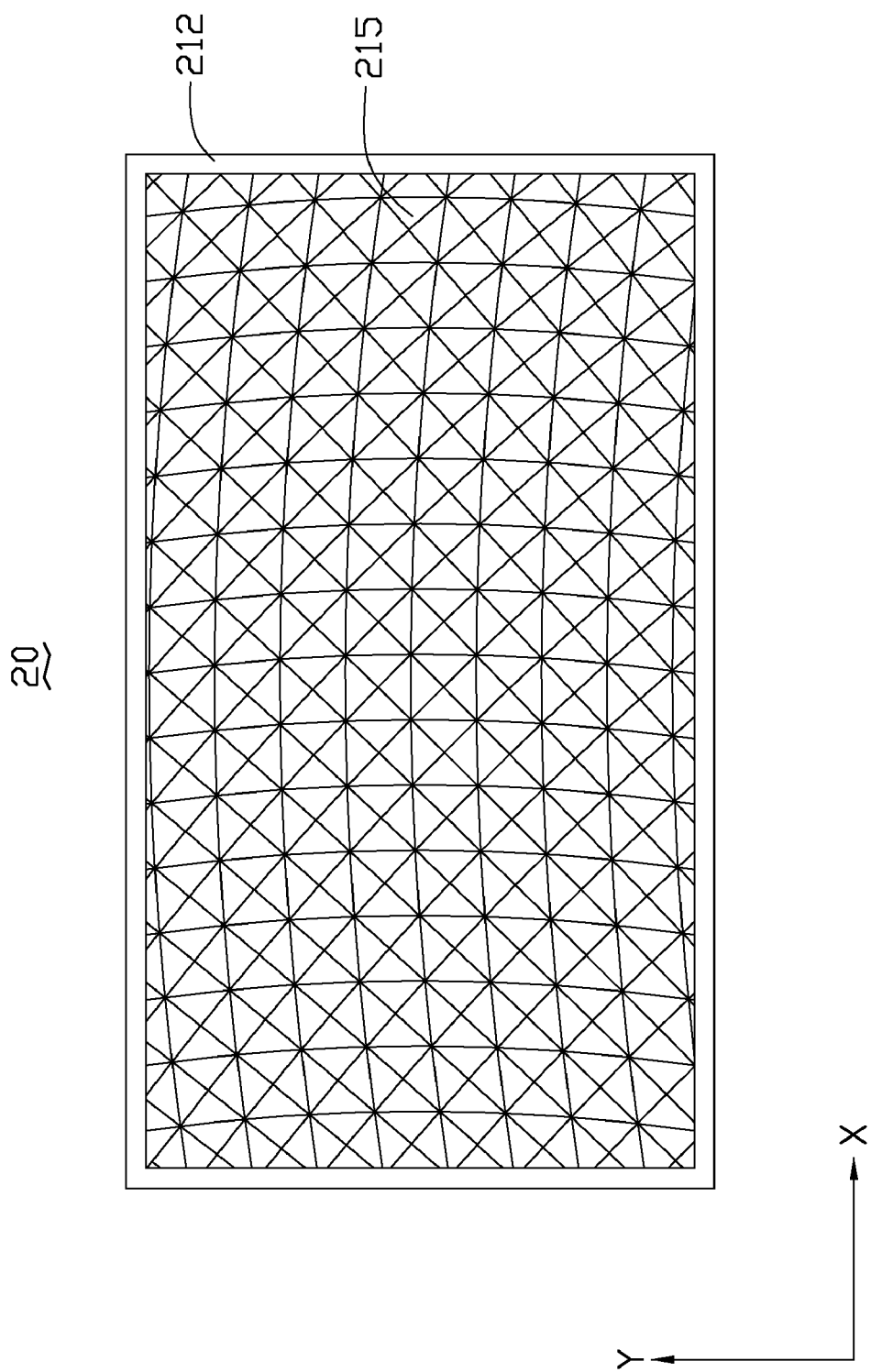
FIG. 2 is a top plan view of the optical plate shown in FIG. 1.

Referring to FIGS. 1 and 2, an optical plate 20 according to a first embodiment is shown. The optical plate 20 includes a transparent layer 21 and a light diffusion layer 23. The transparent layer 21 and the light diffusion layer 23 are integrally formed. That is, the transparent layer 21 and light diffusion layer 23 are in contact with each other at a common interface between them. The transparent layer 21 includes a light input interface 211 and a light output surface 212. The light input interface 211 and the light output surface 212 are on opposite sides of the to transparent layer 21. A plurality of micro-protrusions 215 are formed on the light output surface 212. The light diffusion layer 23 is adjacent to the light input interface 211 of the transparent layer 21.

The micro-protrusions 215 are arranged in a skewed matrix manner. In this embodiment, the micro-protrusions 215 are rectangular pyramid protrusions. Each row of the micro-protrusions 215 extends along a circular arc. The circular arcs have a same curvature, and centers of the circular arcs being aligned apart in a line perpendicular to an X-axis. Each of the micro-protrusions 215 is formed according to the skewed matrix, thus a size, a shape, and a position of each of the micro-protrusions 215 corresponds to rows and columns of the skewed matrix. In the first embodiment, the micro-protrusions 215 have a same shape and a same size. Furthermore, as seen in FIG. 2 each row and each column of the matrix is curved. In the first embodiment, a curvature of each of the rows of the matrix is the same.

The transparent layer 21 can be made of one or more transparent matrix resins selected from the group including polyacrylic acid (PAA), polycarbonate (PC), polystyrene (PS), polymethyl methacrylate (PMMA), methylmethacrylate and styrene (MS), and so on. A thickness of the transparent layer 21 and a thickness of the light diffusion layer 23 can both be equal to or larger than about 0.35 millimeters. In the first embodiment, a value of the combined thickness of the transparent layer 21 and the light diffusion layer 23 can be in the range from about 1 millimeter to about 6 millimeters.

The micro-protrusions 215 are configured for collimating light exiting the optical plate 20. In the first embodiment, a pitch between adjacent micro-protrusions 215 either in the X-direction or a Y-direction, is configured to be in a range from about 0.025 millimeters to about 1 millimeter. A vertex angle of each micro-protrusion 215 is configured to be in the range from about 60 degrees to about 120 degrees.

The light diffusion layer 23 is configured for enhancing optical uniformity. The light diffusion layer 23 includes a transparent matrix resin 231 and a plurality of diffusion particles 233 dispersed in the transparent matrix resin 231. The transparent matrix resin 231 can be one or more materials selected from the group consisting of polyacrylic acid (PAA), polycarbonate (PC), polystyrene (PS), polymethyl methacrylate (PMMA), methylmethacrylate and styrene (MS), and any suitable combination thereof. The diffusion particles 233 can be made of material(s) selected from the group consisting of titanium dioxide, silicon dioxide, acrylic resin, and any combination thereof. The diffusion particles 233 are configured for scattering light and enhancing the light distribution capability of the light diffusion layer 23.

When the optical plate 20 is employed in a typical backlight module, light emitted from light sources (not shown) of the backlight module enters the light diffusion layer 23 of the optical plate 20. The light is substantially diffused in the light diffusion layer 23. Subsequently, most of the light is condensed by the micro-protrusions 215 of the transparent layer 21 when exiting the light output surface 212. As a result, a brightness of the backlight module is increased. In addition, because the arrangement of the micro-protrusions 215 are aligned obliquely with the LCD pixels either in the X-direction or the Y-direction, the typical backlight module employing the optical plate 20 will have little to no moiré pattern interferences between the optical plate 20 and the pixel pitch of LCD panel. Furthermore, because the transparent layer 21 and the light diffusion layer 23 are integrally formed together, the optical plate 20 has no air or gas pockets trapped between the transparent layer 21 and the light diffusion layer 23. Since, there is no air or gas pockets, an efficiency of the typical backlight module is high. The optical plate 20 replaces a conventional combination of a diffusion plate and a prism sheet used in the backlight module, thus, simplifying the assembly process of the backlight module, also, an occupying space needed by the optical plate 20 is generally less than that of the combination of a diffusion plate and a prism sheet. Therefore, the total volume of the backlight module is reduced. Still further, employing the optical plate 20 in the backlight module instead of the combination of two optical plates/sheets reduces costs.

In an alternative embodiment, the micro-protrusions 215 can be arranged along a plurality of separate, circular arcs having a same curvature. Centers of circles defined by the circular arcs are aligned in a straight line along the Y-direction. Preferably, the centers are arranged apart in a constant distance to design two adjacent arrays of the micro-protrusions 215 aligned side by side.

Figure 3:
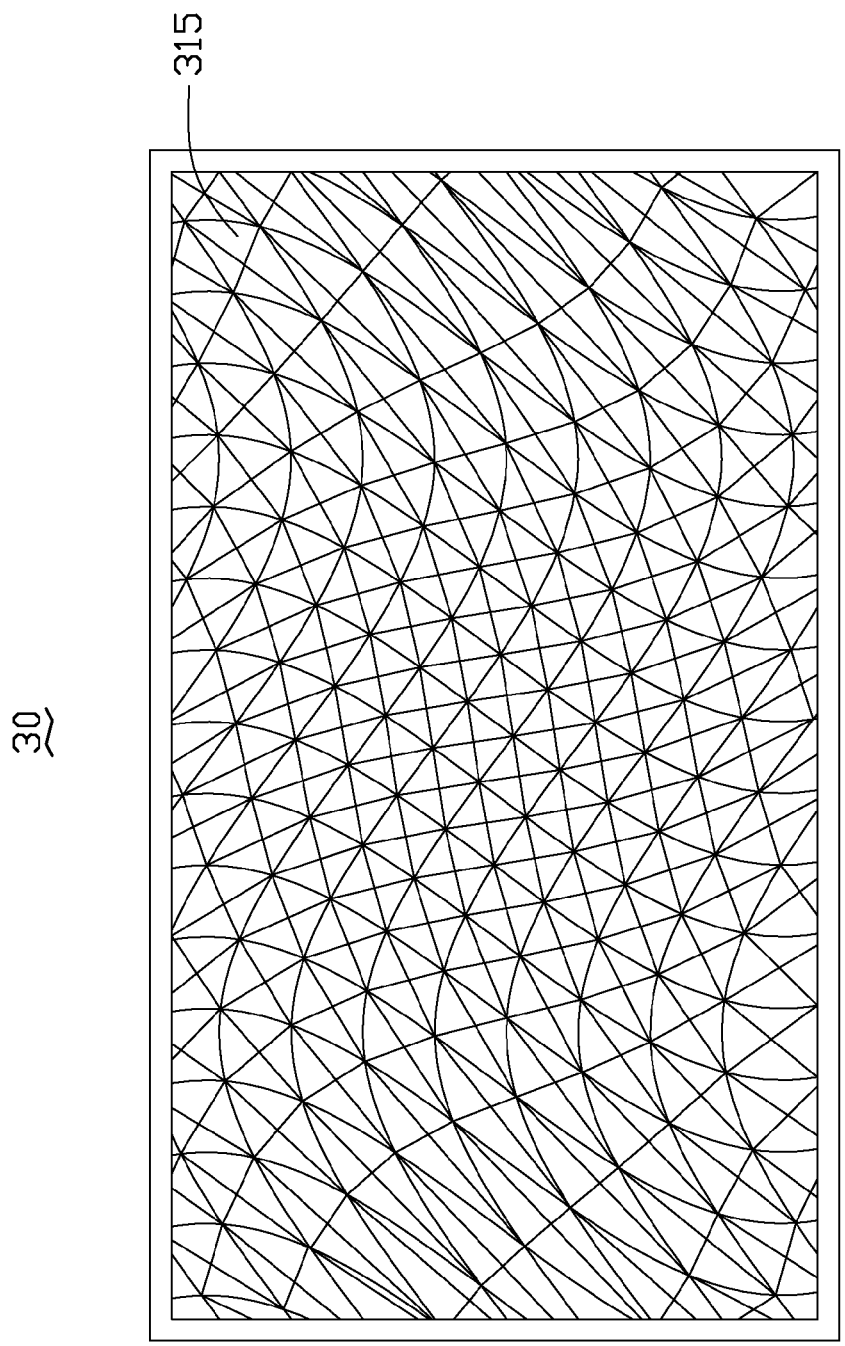
FIG. 3 is a top plan view of an optical plate in accordance with a second embodiment of the present invention.

Referring to FIG. 3, an optical plate 30 in accordance with a second preferred embodiment is shown. The optical plate 30 is similar in principle to the optical plate 20. The micro-protrusions 315 of the optical plate 30 are arranged in a skewed matrix. However, either each row or each column of the micro-protrusions 315 extends along a predetermined S-shaped curve.

Figure 4:
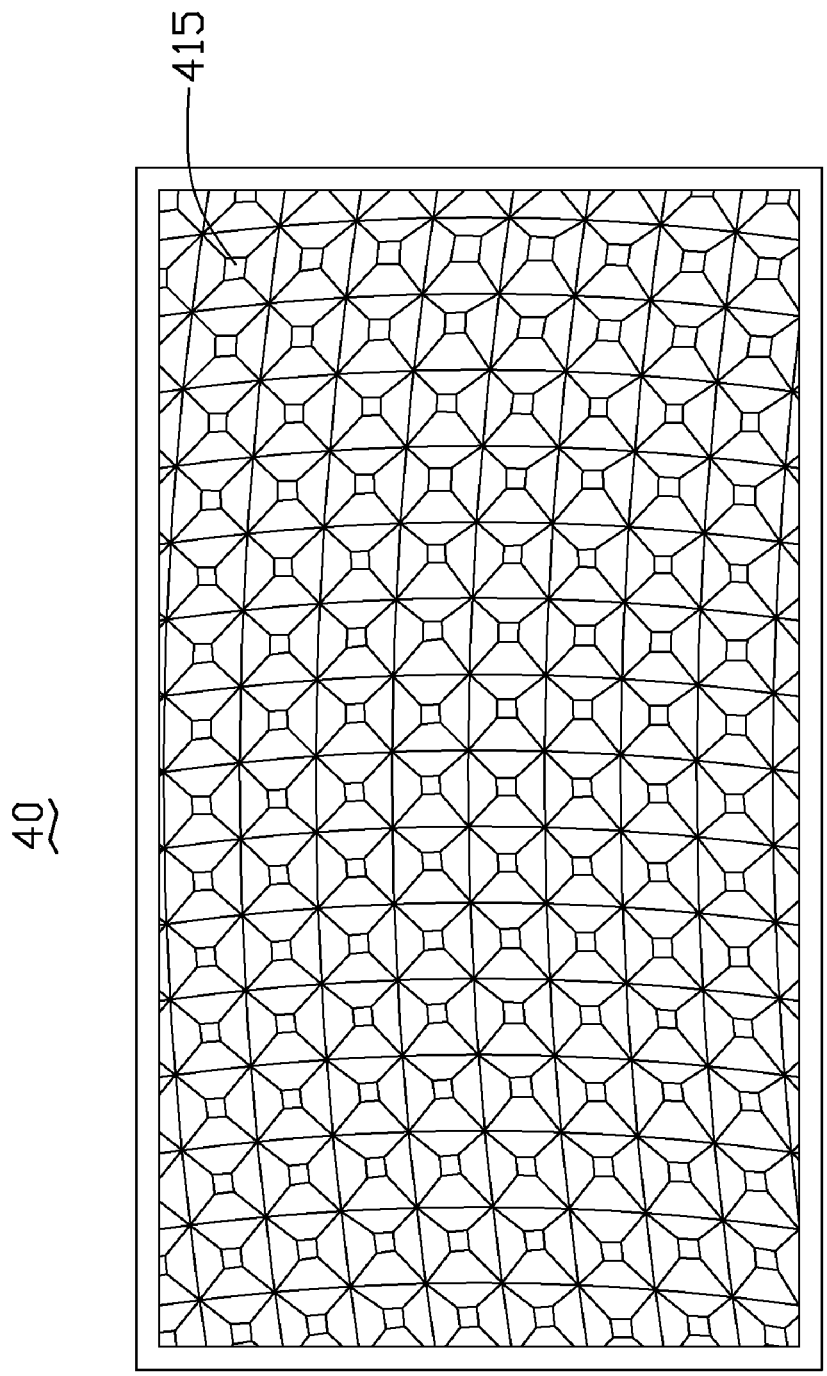
FIG. 4 is a top plan view of an optical plate in accordance with a third embodiment of the present invention.
Figure 5:
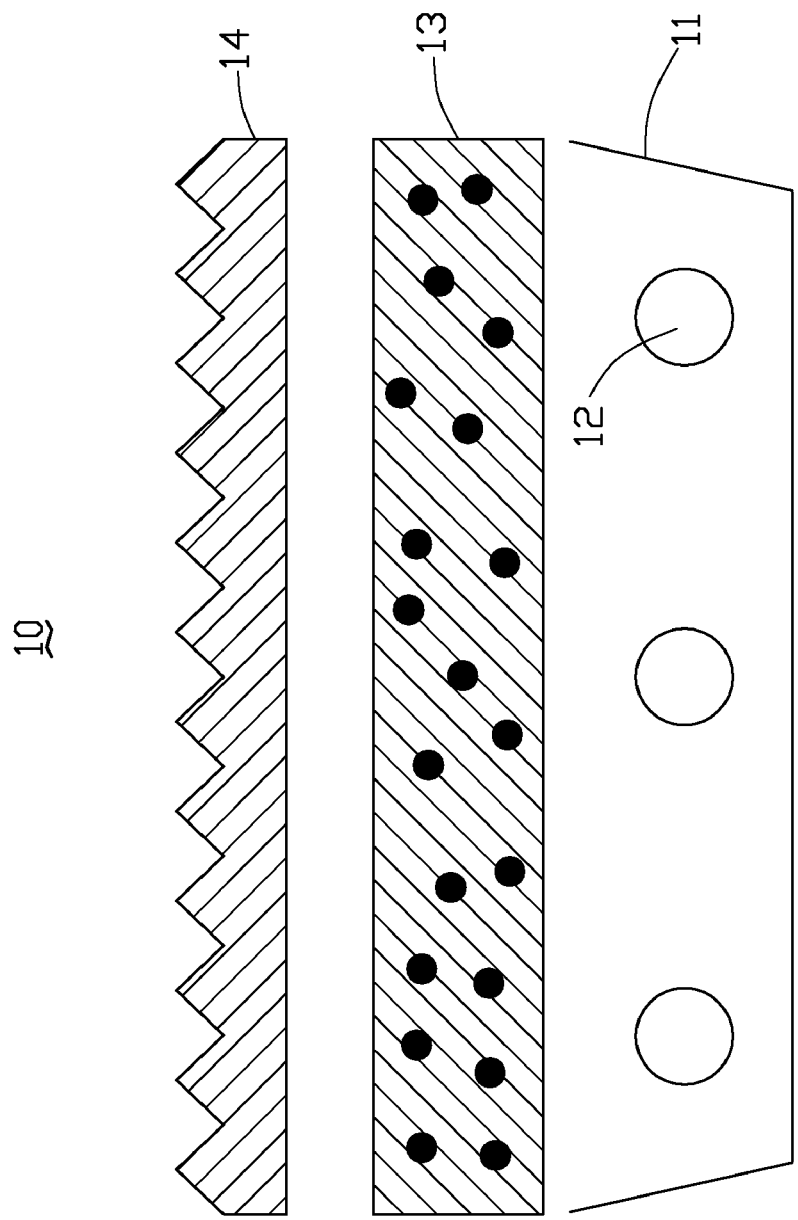
FIG. 5 is an exploded, side cross-sectional view of a conventional backlight module.

Referring to FIG. 4, an optical plate 40 in accordance with a third preferred embodiment is shown. The optical plate 40 is similar in principle to the optical plate 20 of the first embodiment. However, each micro-protrusion 415 of the optical plate has a configuration of a frustum of a four-sided pyramid-like structure. The micro-protrusion 415 includes four side surfaces (not labeled) and a bottom surface (not labeled).

It should be noted that the scope of the present optical plate is not limited to the above-described embodiments. In particular, even though specific shapes of micro-protrusions have been described and illustrated, the micro-protrusions can have various other suitable shapes. For example, the micro-protrusions can be three-sided (triangular) pyramidal protrusions, four-sided (rectangular) pyramidal protrusions, five-sided (pentagonal) pyramidal protrusions, multi-sided (polygonal) pyramidal protrusions, or frustums of these.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical plate, comprising:
   a transparent layer including a light input interface, a light output surface opposite to the light input interface, and a plurality of micro-protrusions formed on the light output surface and arranged in a skewed matrix, wherein the skewed matrix comprises rows and columns, each of the rows and the columns extending along a curved imaginary line; and
   a light diffusion layer integrally formed in immediate contact with the light input interface of the transparent layer, and free of air or gas pockets trapped in an interface therebetween, the light diffusion layer including a transparent matrix resin and a plurality of diffusion particles dispersed in the transparent matrix resin, wherein each micro-protrusion has at least three side surfaces connected to each other, and a transverse width of each side surface decreases along a direction away from the light diffusion layer.

2. The optical plate as claimed in claim 1, wherein each of the rows and the columns of the micro-protrusions extends along a circular arc.

3. The optical plate as claimed in claim 2, wherein the circular arcs of each row have a same curvature, and centers of the circular arcs are aligned apart in a line perpendicular to one edge of the optical plate.

4. The optical plate as claimed in claim 1, wherein each row extends along a predetermined S-shaped curve.

5. The optical plate as claimed in claim 1, wherein a pitch of adjacent two micro-protrusions is in a range from about 0.025 millimeters to about 1 millimeter.

6. The optical plate as claimed in claim 1, wherein the micro-protrusions are shaped in a form selected from the group consisting of four-sided pyramidal protrusions, frustums of four-sided pyramidal protrusions, four-sided pyramid-like protrusions, and frustums of four-sided pyramid-like protrusions.

7. The optical plate as claimed in claim 6, wherein for each four-sided pyramidal protrusion and each frustum of a four-sided pyramidal protrusion, a first pair of opposite sides defines a first dihedral angle, a second pair of opposite sides defines a second dihedral angle, and each of the first and second dihedral angles is in the range from about 60 degrees to about 120 degrees.

8. The optical plate as claimed in claim 1, wherein a thickness of the transparent layer and a thickness of the light diffusion layer are both greater than 0.35 millimeter respectively.

9. The optical plate as claimed in claim 1, wherein the transparent matrix resin is selected from one or more materials consisting of polyacrylic acid, polycarbonate, polystyrene, polymethyl methacrylate, methylmethacrylate and styrene, and any combination thereof.

10. The optical plate as claimed in claim 1, wherein the diffusion particles are made of one or more materials selected from the group consisting of titanium dioxide, silicon dioxide, acrylic resin, and any combination thereof.

* * * * *